Aug. 13, 1929.  DE FOREST KELLOGG  1,724,664
TIRE CASING SUPPORT FOR BUFFING
Filed Nov. 2, 1927
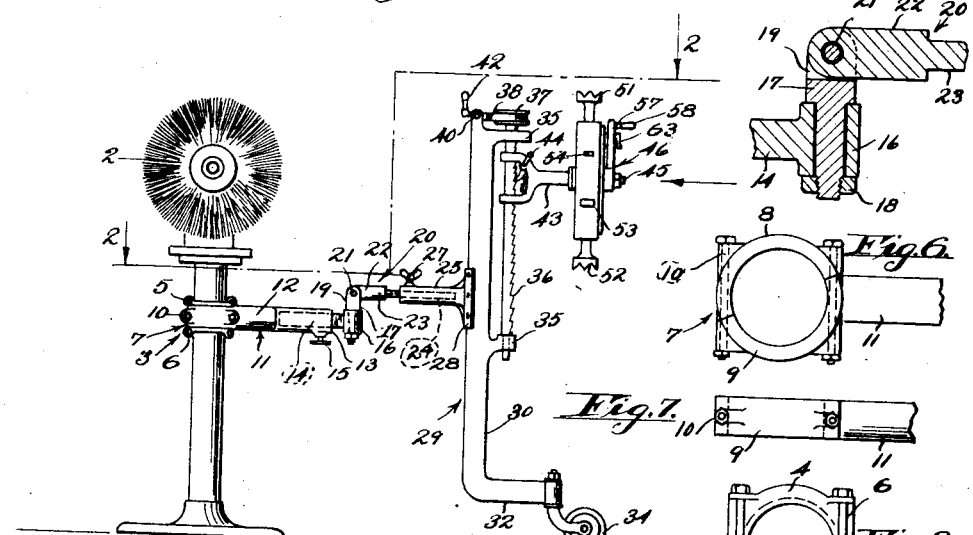
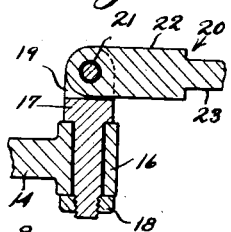
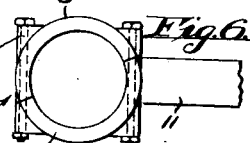
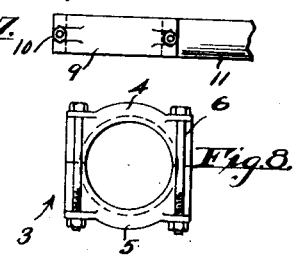
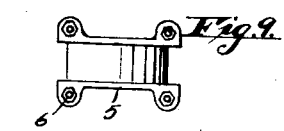
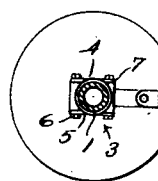
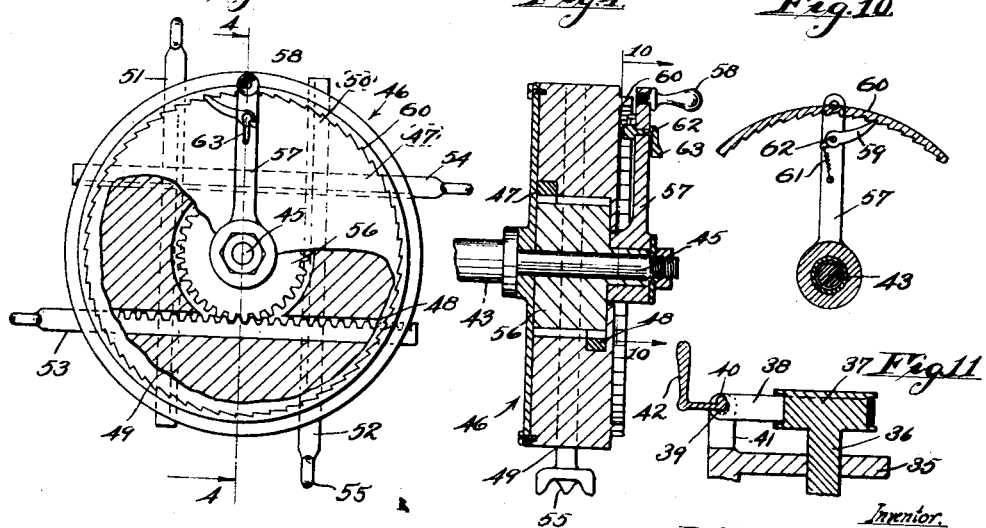
Inventor.
De Forest Kellogg
by Hazard and Miller
Attorneys.

Patented Aug. 13, 1929.

1,724,664

UNITED STATES PATENT OFFICE.

DE FOREST KELLOGG, OF LOS ANGELES, CALIFORNIA.

TIRE-CASING SUPPORT FOR BUFFING.

Application filed November 2, 1927. Serial No. 230,573.

My invention relates to a tire casing support for buffing or similar operation and it is an object of this invention to provide a support on which a tire may be quickly and positively held on a tire carrier which latter, in conjunction with the other mechanism connected therewith, may be quickly and easily adjusted and held in adjusted position, as required, to the action of the buffing or similar tool.

It is another object of this invention to provide a tire casing support in which the tire supported may be moved in contact with the buffing or similar tool at any point on its circumference or at any desired angle.

With the above and other objects in view, my invention consists in the construction and arrangements of parts hereinafter described and claimed.

In the accompanying drawings I have illustrated a preferred embodiment of my invention and in which:

Figure 1 is a front elevation of my tire support showing the same in a central position and connected to a buffing tool.

Fig. 2 is a plan view, with parts of it in section, of the device of Fig. 1 taken on line 2—2.

Fig. 3 is a front elevation, on an enlarged scale and with parts broken away for better illustration, of the tire carrier proper.

Fig. 4 is a vertical section taken on line 4—4 of Fig. 3.

Fig. 5 is a sectional detail view taken on line 5—5 of Fig. 2.

Fig. 6 is a detail plan view of the journal of the tire support engaging the upright or standard of the buffing tool.

Fig. 7 is a side elevation of the journal of Fig. 6.

Fig. 8 is a detail plan view of the bearing on the standard of the buffing tool in which the journal shown in Figs. 6 and 7 is mounted.

Fig. 9 is a side elevation of the bearing shown in Fig. 8.

Fig. 10 is a detail view showing the pawl mechanism on the crank engaging the circular gear on the tire carrier, and Fig. 11 is a detail view in section of the mechanism for locking the vertical rack bar in adjusted position.

Referring to the drawing, 1 indicates a cylindrical upright or standard, at the upper end of which a suitable buffing tool or the like 2 is mounted and driven by any suitable power mechanism, not shown. Vertically adjustable on said standard 1 is a bearing 3, shown in Fig. 8 and 9, consisting of two halves or sections 4 and 5, which are assembled about the standard 1 and clamped in an adjustable position by means of bolts 6. A journal 7, shown in Figs. 6 and 7, consisting of two sections 8 and 9, is mounted on the bearing 3 and bolted together by means of bolts 10. The journal 7 is mounted on the outer end of an arm 11, thus permitting said arm to swing on a vertical axis about the standard 1. The arm 11 consists of two members 12 and 14. Arm member 12 is provided with a socket 13 for the reception of the other arm member 14. The socket 13 and the arm member 14 are preferably square in cross section. The length of the arm 11 may be adjusted and clamped by a set screw 15 on member 12 in adjusted position.

The outer end of arm member 14 constitutes a bearing 16, best shown in Fig. 5, for the reception of a short vertical shaft 17 held in place in the bearing by nut 18 screw threaded on the lower end of shaft 17. The upper end of shaft 17 is forked, as at 19, for the reception of an arm 20, one end of which is pivoted to the shaft 17 by means of a pin 21 passing through the forked end 19. The arm 20 likewise consists of two members 22 and 25. The arm member 22 terminates in a square portion 23 slidable in a square socket 24 in the other arm member 25. A set screw 27 on arm member 25 clamps the two arm sections 22 and 25 in adjusted position. The outer end of arm member 25 is rigidly secured at 28 to a frame 29. This frame consists of an upright 30 which, at the lower end thereof, is provided with legs 31 and 32 and casters 33 and 34. The upright 30 of the frame 29 is provided with a pair of bearings 35 in vertical alignment, in which is mounted a rack bar 36 adapted for rotary adjustment. The upper end of rack bar 36 is provided with a pulley 37 rigidly secured thereto, about which is a brake band 38, the ends of which are provided with apertures 39, through which an eccentric shaft 40 is mounted, said shaft 40 being journaled in the forked end 41 at the upper end of the upright 30 of the frame 29. The eccentric shaft 40 is operated by a handle 42. When the rack bar 36 is adjusted by partial rotation in its bearings 35, the handle 42 is operated to tighten the brake band 38 about pulley 37, thus locking the rack bar 36 in adjusted angular position, as will be understood.

Vertically adjustable on rack bar 36 is a yoke 43 which is provided with a pawl 44 engaging the teeth of the rack bar 36. The pawl 44 is pivoted on the yoke 43 and the said yoke may be slid up or down the rack bar 36 and held in adjusted position by means of pawl 44, as will be understood. The yoke 43 terminates in a horizontal shaft 45, on which is mounted a rotatable tire carrier housing 46. The latter is in the shape of a wheel or disc and is provided with two pairs of spaced channels at right angles to each other, indicated at 47, 48, 49 and 50. Disposed in said channels are the tire rack arms 51, 52, 53 and 54, each carrying at its outer end a tire rest 55.

Centrally disposed and in engagement with each of the tire rack arms 51, 52, 53 and 54, is a gear 56, the rotation of which will cause said tire rack arms to be simultaneously projected or retracted. The gear 56 is mounted on shaft 45 and is operated by means of a crank arm 57 provided with a handle 58. Pivoted on the crank arm 57 is a pawl 59 adapted to engage a circular rack gear 60 provided on the face of the tire carrier 46. A spring 61 tends to move the pawl 59 into engagement with the teeth of the gear 60. The pawl 59 is fast on a pin 62 passing through crank arm 57, on the opposite side of which pin 62 is fast a pawl release arm 63.

*Operation.*—The tire to be buffed is placed over the tire carrier 46 in position so that, when by operating the crank 57, the projecting rack arms 51, 52, 53 and 54, will engage the inside of the tire casing by means of the tire rests 55. When the tire is firmly positioned on said rack arms, the latter are prevented from being retracted by the pawl 59 on crank 57 which will engage the gear 60, holding the rack arms 51, 52, 53 and 54, in their projected position. The tire carrier 46 may be vertically adjusted by means of the yoke 43 which is slidable on the rack bar 36 and the latter may be angularly adjusted by releasing the handle 42 loosening the brake band 38 about pulley 37, enabling the operator to partially rotate rack bar 36 and then again tightening the brake band 38 by the manipulation of handle 42.

The tire carrier 46, which is supported primarily by the frame 29, may be swung on the vertical axis shaft 17 and brought in engagement with the buffing tool 2. Since both the two part arm 20 and the two part arm 11 are longitudinally adjustable, it is obvious that any desired part of the tire mounted on the tire carrier 46 may be easily and quickly presented to the action of the buffing tool 2. Since the tire carrier 46 is loosely mounted on shaft 45, the operator may present any portion of the periphery of the tire to the buffing tool 2, and at any desired angle by the angular adjustment of the rack bar 36.

Various changes may be made by those skilled in the art without departing from the spirit of my invention as described and claimed.

I claim:

1. A tire casing support for buffing and the like comprising an upright, a buffing member thereon, a vertically adjustable bearing on said upright, a two part longitudinally adjustable horizontally swinging arm journaled in said bearing, a vertical shaft rotatably mounted on the outer end of said arm, a second two part longitudinally adjustable horizontal arm secured to said vertical shaft, a frame rigidly secured to said second arm and provided with casters to slide on a floor, a vertical rack shaft mounted in said frame, means for angular adjustment of said rack shaft, a yoke provided with a releasable pawl carried by said rack shaft, a tire carrier mounted on said yoke for rotation on a horizontal axis, two pairs of rack arms provided with tire rests at their outer ends mounted in said casing, a gear engaging said rack arms for simultaneously projecting or retracting said rack arms, a crank operating said gear, a circular rack gear on said tire carrier, and a pawl on said crank engaging said circular rack gear to lock the rack arms in adjusted position.

2. A tire casing support for buffing and the like comprising an upright, a tire operating member thereon, a two part longitudinally adjustable horizontally swinging arm secured to said vertical shaft, a frame secured to said second arm and mounted for sliding movement on a floor, a vertical rack shaft mounted in said frame, means for angular adjustment of said rack shaft, a yoke provided with a releasable pawl carried by said rack shaft, a rotatable tire carrier mounted on said yoke, rack arms provided with tire rests at their outer ends mounted in said casing, a gear engaging said rack arms for simultaneously projecting or retracting said rack arms, a crank operating said gear, and locking means on said crank for holding the rack arms in adjusted position.

3. A tire casing support for buffing and the like comprising an upright, a tire operating member thereon, a horizontally swinging arm mounted on said upright, a vertical shaft rotatably mounted on the outer end of said arm, a second horizontally swinging arm secured to said vertical shaft, a frame secured to said second arm and adapted to slide on a floor, a vertical rack shaft mounted in said frame, means for angular adjustment of said rack shaft, a yoke provided with a releasable pawl carried by said rack shaft, a rotatable tire carrier mounted on said yoke, tire supporting arms provided with tire rests at their outer ends mounted in said casing, means for projecting or retracting said tire carrier arms, and means for locking said arms in position.

4. A tire casing support for buffing and the like comprising a support, a horizontally swinging arm mounted thereon, a vertical shaft on the outer end of said arm, a second horizontally swinging arm mounted on said shaft, a frame secured to the outer end of said second arm, a vertical rack shaft mounted in said frame, means for angular adjustment of said rack shaft, a rotatable tire carrier connected on said rack shaft and provided with means for vertical adjustment thereon, tire engaging elements mounted on said tire carrier, means for projecting and retracting said tire supporting arms, and means for locking said tire supporting arms in adjusted position.

5. A tire casing support for buffing and the like comprising a support, a horizontally swinging arm connected thereto, a second horizontally swinging arm connected to the outer end of said first mentioned arm, means supporting the outer end of said second mentioned arm upon a floor, said supporting means being movable upon the floor, a frame secured to the outer end of said second arm, a rotatable tire carrier connected to said frame, tire supporting elements mounted on said tire carrier, means for projecting or retracting said tire supporting elements, and means for locking said tire supporting elements in adjusted position.

6. A tire casing support for buffing and the like comprising a support, a horizontally swinging arm connected to said support, a second horizontally swinging arm connected to the outer end of said first mentioned arm, a frame rigidly secured to the outer end of said first mentioned arm and provided with means to slide on a floor, a vertical shaft mounted on said frame, means for angular adjustment of said shaft, a yoke slidable on said shaft, a tire carrier mounted for rotation on a horizontal axis and carried by said yoke, tire supporting arms mounted on said tire carrier, means for simultaneously projecting or retracting said tire supporting arms, and means for locking said tire supporting arms in adjusted position.

7. A tire casing support for buffing and the like comprising a support, a frame, connections between said support and said frame permitting said frame to approach said support, means supporting said frame upon a floor and movable upon the floor, a tire carrier mounted for rotation on a horizontal axis and carried by said frame and capable of vertical adjustment thereon, tire supporting arms mounted on said tire carrier, means for projecting and retracting said tire supporting arms, and means for locking said tire supporting arms in adjusted position.

In testimony whereof I have signed my name to this specification.

DE FOREST KELLOGG.